(12) United States Patent
Zeuner et al.

(10) Patent No.: US 7,419,124 B2
(45) Date of Patent: Sep. 2, 2008

(54) MULTI-PURPOSE MOUNT FOR SECURING INSULATION AND HOLDING CABLES

(75) Inventors: Lutz Zeuner, Hardebek (DE); Hans-Georg Plate, Roseburg (DE); Lueder Kosiankowski, Jork (DE); Hans-Peter Guthke, Buxtehude (DE)

(73) Assignee: Airbus Deutschland GmbH (DE)

( * ) Notice: Subject to any disclaimer, the term of this patent is extended or adjusted under 35 U.S.C. 154(b) by 289 days.

(21) Appl. No.: 11/073,446

(22) Filed: Mar. 7, 2005

(65) Prior Publication Data
US 2005/0202692 A1 Sep. 15, 2005

Related U.S. Application Data

(60) Provisional application No. 60/598,245, filed on Aug. 3, 2004.

(30) Foreign Application Priority Data
Mar. 8, 2004 (DE) .................. 10 2004 011 183

(51) Int. Cl.
*F16L 3/22* (2006.01)
*F16L 5/00* (2006.01)
*B64D 45/00* (2006.01)
*F16B 23/00* (2006.01)
*B32B 1/04* (2006.01)

(52) U.S. Cl. .................. 248/68.1; 248/56; 248/71; 248/65; 244/129.2; 244/131; 244/121; 411/400; 428/74

(58) Field of Classification Search .................. 244/119, 244/121, 133, 132, 129.1, 171.7, 131, 129.2; 248/68.1, 49, 56, 57, 71, 72, 73, 65; 411/400, 411/401, 396; 428/74, 131, 121, 192; 174/481, 174/480, 403, 60, 64
See application file for complete search history.

(56) References Cited

U.S. PATENT DOCUMENTS

| | | | | | |
|---|---|---|---|---|---|
| 2,288,845 | A | * | 7/1942 | Schilling | 248/66 |
| 2,354,919 | A | * | 8/1944 | Lockwood | 248/68.1 |
| 2,413,772 | A | * | 1/1947 | Morehouse | 24/457 |
| 2,425,935 | A | * | 8/1947 | Hayman | 174/135 |
| 3,894,706 | A | * | 7/1975 | Mizusawa | 248/68.1 |
| 4,131,257 | A | * | 12/1978 | Sterling | 248/67.5 |
| 4,566,660 | A | * | 1/1986 | Anscher et al. | 248/74.2 |
| 4,865,280 | A | * | 9/1989 | Wollar | 248/68.1 |
| 4,906,155 | A | | 3/1990 | Balza | |

(Continued)

FOREIGN PATENT DOCUMENTS

DE 4208493 A1 * 9/1993

(Continued)

*Primary Examiner*—Michael R. Mansen
*Assistant Examiner*—Joshua J Michener
(74) *Attorney, Agent, or Firm*—Lerner, David, Littenberg, Krumholz & Mentlik, LLP

(57) ABSTRACT

A mount for an aircraft secures insulation material to a structure of the aircraft in which a plate-shaped element and a connecting element that are implemented from a very heat-resistant material are provided. The remainder of the hanger may be implemented from plastic. Under the effect of strong heat, the plastic may melt. An insulation mat is nonetheless secured against falling down/detaching by the plate-shaped element, which is supported using the connecting element.

7 Claims, 2 Drawing Sheets

U.S. PATENT DOCUMENTS

| | | |
|---|---|---|
| 5,098,047 A * | 3/1992 | Plumley .................... 248/68.1 |
| 5,553,368 A * | 9/1996 | Barry .......................... 29/423 |
| 5,866,231 A * | 2/1999 | Bodin et al. ................ 428/131 |
| 5,992,802 A * | 11/1999 | Campbell ................... 248/68.1 |
| 6,299,106 B1 * | 10/2001 | Shorey .................... 244/171.7 |
| 6,315,250 B1 * | 11/2001 | Meyer ....................... 248/74.1 |
| 6,358,591 B1 * | 3/2002 | Smith .......................... 428/74 |
| 6,494,411 B1 * | 12/2002 | Bjorklund .................... 248/49 |
| 6,799,607 B1 * | 10/2004 | Friedline et al. ............ 138/106 |
| 6,827,312 B2 * | 12/2004 | Riedell .................... 244/159.1 |
| 2003/0042363 A1 * | 3/2003 | Dussac et al. ............... 244/119 |
| 2006/0284014 A1 * | 12/2006 | Muller et al. ............... 244/119 |

FOREIGN PATENT DOCUMENTS

| | | |
|---|---|---|
| DE | 19513206 | 10/1996 |
| EP | 0 320 377 A1 | 6/1989 |
| WO | WO-00/75012 A1 | 12/2000 |

* cited by examiner

MULTI-PURPOSE MOUNT FOR SECURING INSULATION AND HOLDING CABLES

CROSS-REFERENCE TO RELATED APPLICATIONS

This application claims the benefit of the filing date of U.S. Provisional Patent Application No. 60/598,245 filed Aug. 3, 2004, the disclosure of which is hereby incorporated herein by reference.

BACKGROUND OF THE INVENTION

The present invention relates to supporting cable line bundles or line routes and insulation materials such as insulation mats in aircraft. The present invention particularly relates to a mount for an aircraft for securing insulation material to a structure of the aircraft as well as an aircraft having a corresponding mount.

In aircraft, cable mounts are used to support and guide electrical line routes in different regions. Such mounts are tailored to the concrete connection conditions on the transversal carrier or frame (former), for example. For example, the mounts are tailored to the thickness of the web of the transversal carrier, to a hole diameter, and to a diameter of the electrical line routes.

SUMMARY OF THE INVENTION

According to one exemplary embodiment of the present invention, a mount for an aircraft is provided for securing insulation material to a structure of the aircraft. The insulation material has at least one recess having first dimensions. The mount of this exemplary embodiment comprises a first cable mount section and a second cable mount section. The first and the second cable mount sections are essentially made of a first material. This first material is plastic. For example, the first and the second cable mount sections may be manufactured through an injection molding method. The first and the second cable mount sections are connectable via a connecting element. The connecting element supports at least one plate-shaped element which has second dimensions that are larger than the first dimensions. Therefore, the plate-shaped element does not fit through the recess in the insulation material. The connecting element and the at least one plate-shaped element are made essentially of a second material, which is more heat-resistant or fire-resistant than the first material.

According to an embodiment of the invention, a mount is provided which, in addition to the function of supporting and guiding electrical line routes, pipes, etc., on ascending and descending routes, for example, may also support insulation mats which may be provided on structures of the aircraft.

Multipurpose mounts for supporting insulation material on structures in aircraft may, if they are implemented from plastic, melt in the event of great heat. However, the use of plastic may be desirable for saving weight. According to one exemplary embodiment of the present invention, a hanger is specified in which a plate-shaped element and a connecting element that are implemented from a very heat-resistant material are provided. The remainder of the hanger may be implemented from plastic. Under the effect of strong heat, the plastic may melt. An insulation mat may nonetheless be secured against falling down/detaching by the plate-shaped element, which is supported using the connecting element.

Therefore, a mount for aircraft may be specified, which may reliably prevent the insulation material from being able to slip over the plate-shaped element and therefore fall down in the event of great heat, under the effect of fire, for example. This may be achieved in that the plate-shaped element and the connecting element are made of a more heat-resistant or fire-resistant material, so that in case of fire, for example, the cable mount sections may melt, but slipping of the heat-resistant insulation material over the plate-shaped element is prevented, through which the structure of the aircraft and/or the passengers located in the aircraft are protected. A mount which is resistant to burning through and therefore prevents the loss of the insulation mat is specified according to an exemplary embodiment of the present invention.

According to a further exemplary embodiment of the present invention, the mount is implemented as a multipurpose mount and additionally has a cable receiving region for supporting cables. In this way, a multipurpose mount is specified which may both securely hold insulation material, even in case of fire, and is also suitable and usable for cable support and guiding.

According to a further exemplary embodiment of the present invention, the second material is a metal, because of which the connecting element and the plate-shaped element only melt later or even not at all, even in the event of very strong heat or in case of fire.

According to a further exemplary embodiment of the present invention, the plate-shaped element is a metal disk which is incorporated into the plastic of the first or second cable mount section. A notch may be provided for this purpose, for example, on which the metal disk, which may also be an open metal disk in the form of a split pin, may be placed.

According to a further exemplary embodiment of the present invention, the metal disk is implemented in one piece (may be integrally formed) with the first or second cable mount section. For example, the metal disk may be cast into the plastic material of the cable mount sections.

According to a further exemplary embodiment of the present invention, the connecting element is implemented using a metal screw and a metal nut. The metal nut is supported in one cable mount section, whereas the metal screw is supported in the other corresponding cable mount section. The plate-shaped element has a recess which has smaller dimensions than a head of the screw and the nut. When the mount is mounted, the plate-shaped element is positioned between the head of the screw and the nut. Therefore, in case of fire, even if all of the plastic of the cable mount section has melted, the insulation material, such as an insulation mat, may be supported and may be prevented from slipping off or falling down, through which protection of the interior is provided.

According to a further exemplary embodiment of the present invention, two plate-shaped elements are provided, which are positioned between the head of the metal screw and the nut when the cable mount sections are mounted. An insulation mat may thus be secured against falling down on two sides of a structure, for example.

Further exemplary embodiments of the present invention result from the further claims.

In the following, exemplary embodiments of the present invention are described with reference to the attached figures.

DETAILED DESCRIPTION

In the following description of FIGS. 1 through 5, identical reference numbers are used for identical or corresponding elements.

Figure 1:
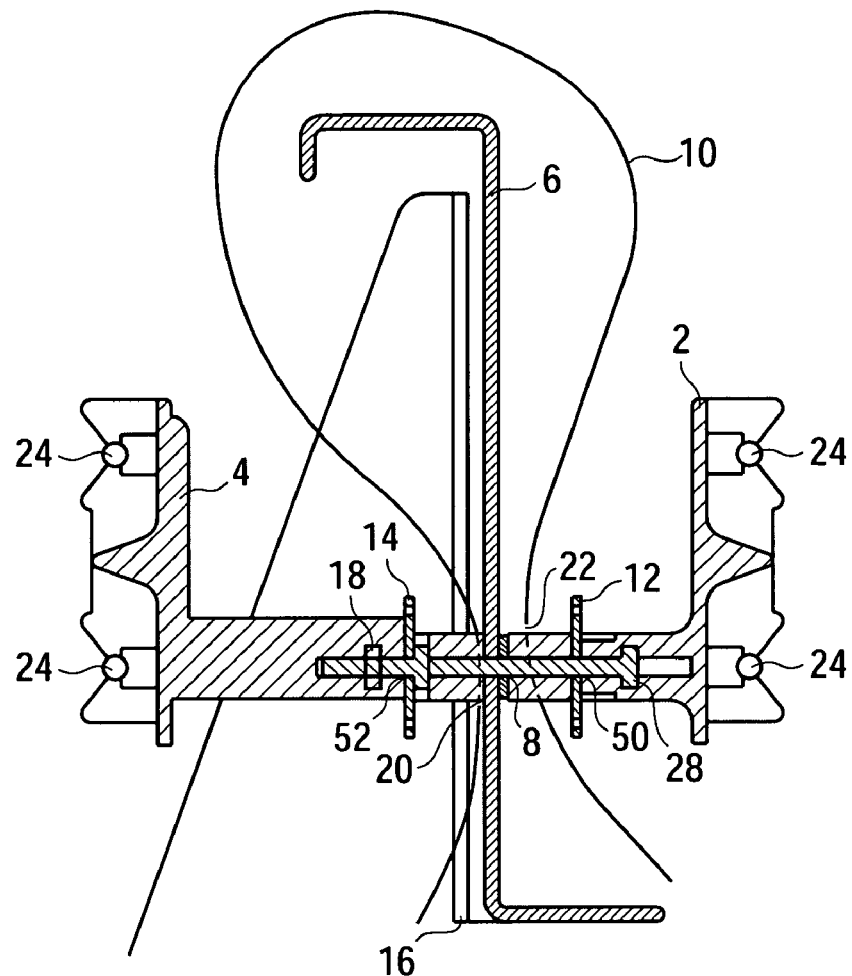
FIG. 1 shows a sectional view of a first exemplary embodiment of a mount, which is mounted on a frame structure, according to an exemplary embodiment of the present invention.

FIG. 1 shows a sectional view of a first exemplary embodiment of a mount for an aircraft according to the present invention. As may be inferred from FIG. 1, the mount is positioned in a hole or bore of a frame or former 6. A support structure 16 of the frame 6 is shown in the background. As may be inferred from FIG. 1, the mount has a first cable mount section 2 and a second cable mount section 4. According to one exemplary embodiment of the present invention, the first and the second cable mount sections 2 and 4 are essentially implemented from a plastic material. The first and the second cable mount sections 2, 4 may be manufactured using an injection molding method, for example. The first cable mount section 2 has an essentially L-shaped structure in section. The second cable mount section 4 also has an essentially L-shaped structure in section. The first cable mount section 2 has a part having dimensions such that it may be inserted through a recess 22 in an insulation material 10. The first cable mount section 2 has an essentially flat surface on a first end to be placed on the frame 6. A plate-shaped element 12 is provided on the part, wherein the dimensions of the plate-shaped element 12 are larger than the dimensions of the recess or the hole 22 in the insulation material. Cable receiver sections 24, in which the cable may be laid to support it, are provided on a region opposing the first end of the first cable mount section 2. The cables or line routes may then be attached using cable binders, for example. Line routes may have a diameter from 5 to 60 mm, for example. The mount may be implemented for "heavy" line routes having a diameter of approximately 15-60 mm, particularly for routes of 25 mm diameter.

Like the first cable mount section 2, the second cable mount section 4 has two cable receiving regions 24 for receiving two line routes. Furthermore, the second cable mount section 4 has an end region opposite the cable receiving regions 24, which has an essentially flat surface to be placed on the frame 6.

The first cable mount section 2 and the second cable mount section 4 are connected using a connecting element 18, 28. The connecting element has a screw 28, which is supported in the first cable mount section 2. In particular, the head of the screw may be supported in the first cable mount section 2. The nut 18 is supported in the second cable mount section 4. The screw 28 may thus be inserted through the eyelet (the hole) 8 in the frame and the screw 28 may be screwed together with the nut 18 in the second cable mount section 4, so that the first and the second cable mount sections 2, 4 are clamped on the frame 6.

A further plate-shaped element 14, which has larger dimensions than a recess or hole 20 in the insulation material 10, is provided on the second cable mount section 4.

As may be inferred from FIG. 1, because of the positioning of the plate-shaped elements 12 and 14, which may be implemented using metal disks, for example, the insulation material 10 may be prevented from falling down, i.e., the insulation material 10 may be prevented from slipping off the mount even in the event of great heat, as in case of fire, for example, since the plate-shaped elements are supported by the connecting element having the screw 28 and the nut 18. For this purpose, the nut 18 has dimensions which are larger than a recess 52 in the plate-shaped element 14. In addition, the head of the screw 28 has dimensions which are larger than a recess 50 in the plate-shaped element 12. In this way, for example, all of the plastic of the mount may melt without the securing of the insulation material 10 by the connecting element, comprising the screw 28, the nut 18, and the plate-shaped elements 12 and 14, being endangered, since these elements may be implemented from a very heat-resistant or fire-resistant material. The screw 28, the nut 18, and the plate-shaped elements 14 and 12 may be implemented from metal.

The plate-shaped elements 12 and 14 may, for example, be incorporated into the plastic of the first cable mount section 2 and the second cable mount section 4. For example, the plate-shaped elements 12 and 14 may be heated and pushed onto the plastic. Welding on through frictional welding is also possible. The plate-shaped elements 12 and 14 may be implemented in one piece with the first and second cable mount sections using an injection molding method, however.

Instead of the connecting element having the screw 28 and the nut 18, a screw-lock system may also be provided, for example. An arbor having a barb, which is inserted into a corresponding support device in the other cable mount section and thus ensures a secure connection, may also be provided instead of the screw 28.

The screw 28 and the nut 18 may each be pushed through openings provided laterally in the first cable mount section and the second cable mount section. However, it is also possible to cast the nut 18 and the screw 28 in one piece with the first cable mount section and the second cable mount section.

The plate-shaped elements 12, 14 may be implemented as inmolded metal washers.

Figure 2:
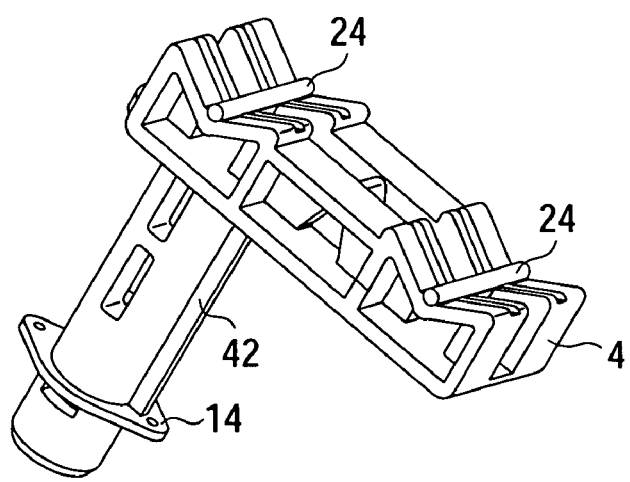
FIG. 2 shows a three-dimensional view of a first exemplary embodiment of a first cable mount section according to the present invention.

FIG. 2 shows a perspective view of a first exemplary embodiment of the cable mount section according to the present invention.

As may be inferred from FIG. 2, this cable mount section 4 has two receivers 24 for line routes. As may be inferred from FIG. 2, this cable mount section is a cable mount section into which a screw of the corresponding other cable mount section is to be inserted. The nut 18 may be inserted into a side region of the cable mount 4 through a recess 42, for example. The plate-shaped element 14 is implemented in FIG. 2 as an essentially ellipsoidal metal washer, which is cast into the plastic of the cable mount section 4.

Figure 3:
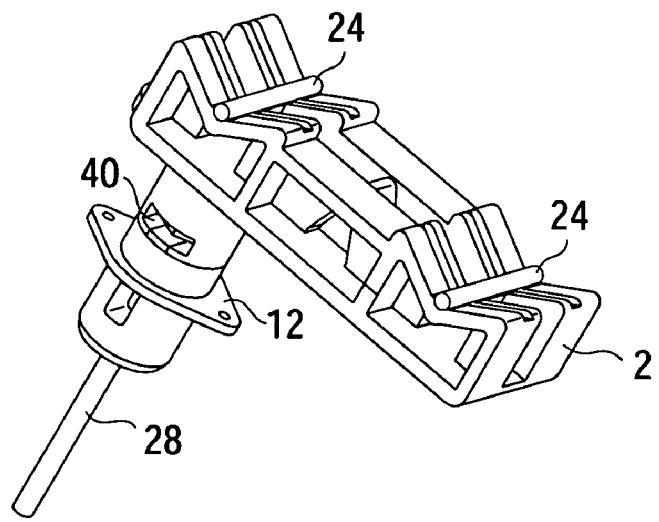
FIG. 3 shows a three-dimensional view of a first exemplary embodiment of a second cable mount section according to the present invention.

FIG. 3 shows a perspective view of a cable mount section according to one exemplary embodiment of the present invention. As may be inferred from FIG. 3, a screw 28 is provided in this cable mount section, which may be pushed into the cable mount section of FIG. 2, for example, and then screwed together with the corresponding nut.

The screw 28 may, for example, be cast into the cable mount section 2 of FIG. 3. However, it is also possible to insert a threaded rod from the front into a corresponding hole of the cable mount section and then attach this threaded rod in the cable mount section 2 using a fastener, which may be inserted laterally into a recess 40. As may be inferred from FIG. 3, the cable mount section 2 also has two cable receiving regions 24. As in the cable mount from FIG. 1, the plate-shaped element 12 is implemented using an essentially ellipsoidal metal washer which is cast into the plastic of the cable mount 2. Instead of the metal washer or blank, manifold shaped elements may be used, as long as it is ensured that the eyelet in the insulation material may not slip over the shaped element.

Figure 4:
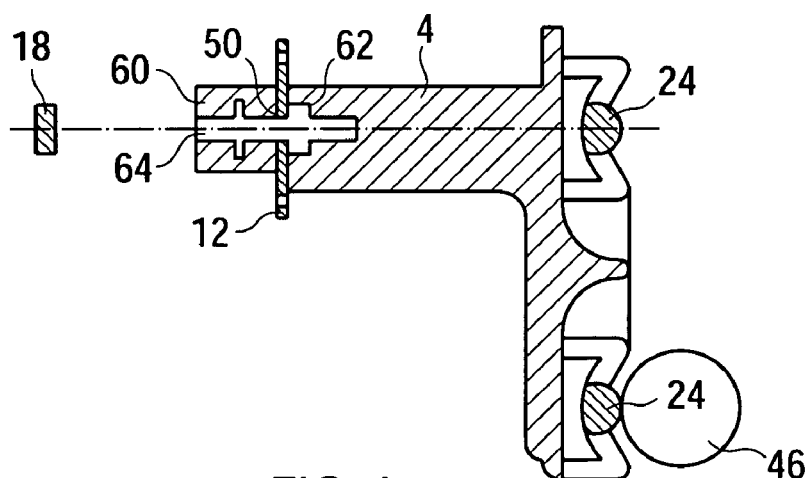
FIG. 4 shows a sectional view of the first cable mount section from FIG. 2.

FIG. 4 shows a sectional view of the cable mount from FIG. 2. As may be inferred from FIG. 4, a cable 46, which may be attached using a cable binder, for example, may be received in the cable mount section 24. It may be inferred from the sectional view of FIG. 4 that a hole 64 is provided in the cable mount section 4, into which the screw 28 of the corresponding other cable mount section 2 may be inserted. This hole 64 is bored into the face of the area or surface 60 of the cable mount section 4, which is implemented to be placed on the frame 6. Furthermore, a space 62 for positioning the nut 18 is provided in the hole 64. The nut, as already noted, may be inserted into the space 62 through a recess 42, for example. As may be inferred from FIG. 4, the nut 18 has dimensions that are larger than the recess 50 in the plate-shaped element 12, which may be implemented using the ellipsoidal metal washer 14, for example.

Figure 5:
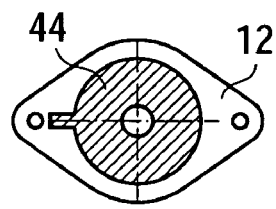
FIG. 5 shows a first exemplary embodiment of a plate-shaped element according to the present invention.

FIG. 5 shows a top view of an exemplary embodiment of the plate-shaped element 12. The hatched middle region of the plate-shaped element 12 is the region which is cast with the plastic of the corresponding cable mount section. A hole 44 for inserting the screw 28 through is provided in the middle of the plate-shaped element 12.

A cable mount is provided according to the present invention, which additionally assumes the function of securing insulation material, such as insulation mats, as are used for protecting frames in the aircraft against the effect of heat, for example. If the plastic melted in case of strong heating, for example, the insulation would still be supported between the metal blanks, whose diameter is larger than the eyes of the insulation mat, and thus offer more security.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A mount for an aircraft for securing insulation material to a structure of the aircraft, wherein the insulation material has at least one hole having a first set of dimensions, the mount comprising: a first cable mount section; and a second cable mount section; wherein the first and the second cable mount sections are essentially made of a first material; wherein the first material is plastic; wherein the first and the second cable mount sections are connectable via a connecting element; wherein the connecting element is guided through an at least one recess of the insulation material; wherein the connecting element supports at least two plate shaped elements; wherein a first of the at least two plate-shaped elements has a second set of dimensions, which is larger than the first set of dimensions, so that the first of the at least two plate-shaped elements does not fit through the hole of the insulation material; wherein the insulation material is positioned between the at least two plate-shaped elements and is secured against falling down by the at least two plate-shaped elements; wherein the connecting element and the at least two plate-shaped elements are essentially made of a second material; wherein the second material is more heat-resistant or more fire-resistant than the first material; wherein the connecting element has a metal screw which is supported in one of the first and second cable mount sections; wherein the connecting element further has a metal nut which is supported in the other one of the first and second cable mount sections; wherein a head of the screw has a third set of dimensions representing the largest diameter of the screw head; wherein the nut has a fourth set of dimensions representing the distance across the nut; wherein one of the at least two plate-shaped elements has a hole having a fifth set of dimensions; wherein the fifth set of dimensions is smaller than the third and the fourth sets of dimensions; and wherein; when the first and second cable mount sections are connected, one of the at least two plate-shaped elements is positioned between the head of the metal screw and the nut.

2. The mount of claim 1, wherein at least one of the first and second cable mount sections has a cable receiving region for receiving and supporting cables.

3. The mount of claim 1, wherein the second material is a metal.

4. The mount of claim 1, wherein at least one of the at least two plate-shaped elements is a metal disk which is integrated into the plastic of the first or second cable mount section.

5. The mount of claim 4, wherein the metal disk is integrally formed with the first or second cable mount section.

6. The mount of claim 1, wherein two plate-shaped elements are provided; wherein both plate-shaped elements have sets of dimensions which are larger than the first set of dimensions; wherein both plate-shaped elements are positioned between the head of the metal screw and the nut when the first and second cable mount sections are connected.

7. An aircraft comprising a mount for the aircraft for securing insulation material to a structure of the aircraft, wherein the insulation material has at least one hole having a first set of dimensions, the mount comprising: a first cable mount section; and a second cable mount section; wherein the first and the second cable mount sections are essentially made of a first material; wherein the first material is plastic; wherein the first and the second cable mount sections are connectable via a connecting element; wherein the connecting element is guided through the at least one recess of the insulation material; wherein the connecting element supports at least two plate-shaped elements; wherein a first of the at least two plate-shaped elements has a second set of dimensions, which is larger than the first set of dimensions, so that the first of the at least two plate-shaped elements does not fit through a recess of the insulation material; wherein the insulation material is positioned between two plate-shaped elements and is secured against falling down by the two plate-shaped elements; wherein the connecting element and the at least two plate-shaped elements are essentially made of a second material; wherein the second material is more heat-resistant or more fire-resistant than the first material; wherein the connecting element has a metal screw which is supported in one of the first and second cable mount sections; wherein the connecting element further has a metal nut which is supported in the other one of the first and second cable mount sections; wherein a head of the screw has a third set of dimensions representing the largest diameter of the screw head; wherein the nut has a fourth set of dimensions representing the distance across the nut; wherein one of the at least two plate-shaped elements has a hole having a fifth set of dimensions; wherein the fifth set of dimensions is smaller than the third and the fourth sets of dimensions; and wherein; when the first and second cable mount sections are connected, one of the at least two plate-shaped elements is positioned between the head of the metal screw and the nut.

* * * * *

UNITED STATES PATENT AND TRADEMARK OFFICE
CERTIFICATE OF CORRECTION

PATENT NO. : 7,419,124 B2
APPLICATION NO. : 11/073446
DATED : September 2, 2008
INVENTOR(S) : Zeuner et al.

It is certified that error appears in the above-identified patent and that said Letters Patent is hereby corrected as shown below:

Col. 5, Line 51 "plate shaped" should read --plate-shaped--.

Signed and Sealed this

Twentieth Day of April, 2010

David J. Kappos
*Director of the United States Patent and Trademark Office*